United States Patent
Reddy et al.

(10) Patent No.: US 9,458,014 B2
(45) Date of Patent: Oct. 4, 2016

(54) SYTEMS AND METHOD FOR $CO_2$ CAPTURE AND $H_2$ SEPARATION WITH THREE WATER-GAS SHIFT REACTIONS AND WARM DESULFURIZATION

(71) Applicant: General Electric Company, Schenectady, NY (US)

(72) Inventors: Thirumala Reddy Nagarjuna Reddy, Bangalore (IN); Ashok Kumar Anand, Schenectady, NY (US); Mahendhra Muthuramalingam, Chennai (IN)

(73) Assignee: General Electronic Company, Schenectady, NY (US)

( * ) Notice: Subject to any disclaimer, the term of this patent is extended or adjusted under 35 U.S.C. 154(b) by 712 days.

(21) Appl. No.: 13/729,097

(22) Filed: Dec. 28, 2012

(65) Prior Publication Data

US 2014/0182300 A1 Jul. 3, 2014

(51) Int. Cl.
*C01B 3/50* (2006.01)
*C10K 1/00* (2006.01)
*F02C 3/20* (2006.01)
*F02C 3/28* (2006.01)
(Continued)

(52) U.S. Cl.
CPC . *C01B 3/50* (2013.01); *C01B 3/12* (2013.01); *C01B 3/501* (2013.01); *C10K 1/004* (2013.01); *C10K 1/005* (2013.01); *C10K 3/04* (2013.01); *F02C 3/20* (2013.01); *F02C 3/28* (2013.01); *C01B 2203/0255* (2013.01); *C01B 2203/0294* (2013.01); *C01B 2203/047* (2013.01); *C01B 2203/0415* (2013.01); *C01B 2203/0455* (2013.01); *C01B 2203/0485* (2013.01); *C01B 2203/0495* (2013.01); *C01B 2203/1247* (2013.01); *C01B 2203/84* (2013.01); *C10J 2300/0959* (2013.01); *C10J 2300/165* (2013.01); *C10J 2300/1678* (2013.01); *F05D 2260/61* (2013.01); *Y02E 20/16* (2013.01); *Y02E 20/18* (2013.01); *Y02P 30/30* (2015.11)

(58) Field of Classification Search
CPC ..... Y02E 20/16; Y02E 20/18; Y02E 20/185; Y02E 50/32; F02C 3/20; F02C 3/28; C10K 3/04; C10K 1/004; C01B 3/16
USPC ...................................................... 95/47, 55
See application file for complete search history.

(56) References Cited

U.S. PATENT DOCUMENTS 3,634,113 A   1/1972 Fehrenbacher
3,645,894 A   2/1972 Krystyniak
(Continued)

*Primary Examiner* — Gerald L Sung
*Assistant Examiner* — Alain Chau
(74) *Attorney, Agent, or Firm* — Nixon & Vanderhye P.C.

(57) ABSTRACT

A method and system for capturing and isolating carbon dioxide and hydrogen gases from a high temperature synthesis gas stream containing a substantial amount of CO and sulfur compounds for use as a "clean" supplemental fuel, comprising the steps of reducing the temperature of the high temperature synthesis gas stream, removing substantially all of the sulfur compounds present in the synthesis gas, converting a first portion of CO to carbon dioxide in a first high temperature water-gas shift reaction, converting a second portion of CO to carbon dioxide using a second low temperature water-gas shift reaction, converting a third portion of CO to carbon dioxide using a third low temperature water-gas shift reaction and then separating out substantially all hydrogen present in the treated synthesis gas stream.

20 Claims, 1 Drawing Sheet

(51) Int. Cl.
  *C10K 3/04*    (2006.01)
  *C01B 3/12*    (2006.01)

(56) References Cited

U.S. PATENT DOCUMENTS

| | | | |
|---|---|---|---|
| 3,957,500 A | | 5/1976 | Pitts |
| 4,021,366 A | * | 5/1977 | Robin et al. ............... 252/373 |
| 4,055,705 A | | 10/1977 | Stecura et al. |
| 4,132,916 A | | 1/1979 | Hueschen et al. |
| 4,205,051 A | | 5/1980 | Takahashi et al. |
| 4,248,940 A | | 2/1981 | Goward et al. |
| 4,328,285 A | | 5/1982 | Siemers et al. |
| 4,399,199 A | | 8/1983 | McGill et al. |
| 4,676,994 A | | 6/1987 | Demaray |
| 4,861,618 A | | 8/1989 | Vine et al. |
| 4,880,439 A | * | 11/1989 | Najjar et al. .............. 48/197 R |
| 4,996,117 A | | 2/1991 | Chu et al. |
| 5,603,771 A | | 2/1997 | Seiberras et al. |
| 5,660,885 A | | 8/1997 | Hasz et al. |
| 7,160,343 B2 | * | 1/2007 | Rowe et al. ................ 48/198.3 |
| 8,679,450 B2 | * | 3/2014 | Van Den Berg et al. .... 423/655 |
| 2010/0324156 A1 | * | 12/2010 | Winter et al. ................ 518/705 |
| 2011/0020188 A1 | * | 1/2011 | Muthuramalingam et al. ............................ 422/169 |
| 2011/0030384 A1 | * | 2/2011 | Ku et al. ......................... 60/780 |
| 2011/0162385 A1 | * | 7/2011 | Kidambi et al. ................ 60/784 |
| 2011/0229382 A1 | * | 9/2011 | Frydman et al. .............. 422/621 |
| 2012/0198768 A1 | * | 8/2012 | Khosravian et al. ............. 48/61 |
| 2014/0264178 A1 | * | 9/2014 | Abbott et al. ................. 252/373 |

* cited by examiner

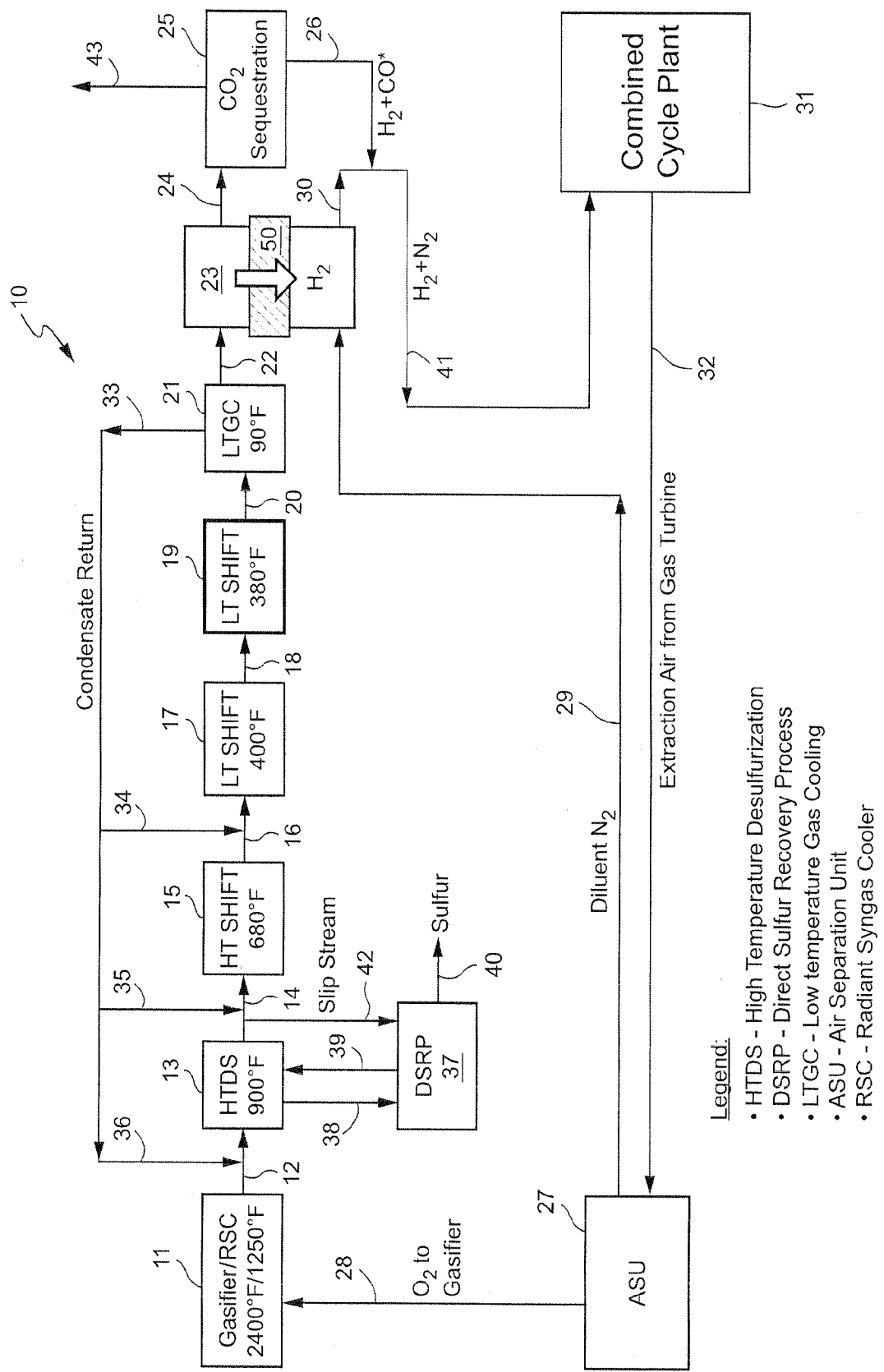

SYTEMS AND METHOD FOR CO₂ CAPTURE AND H₂ SEPARATION WITH THREE WATER-GAS SHIFT REACTIONS AND WARM DESULFURIZATION

The present invention relates to a method and system for removing undesirable chemical constituents from a synthesis gas stream in order to produce a more fuel efficient feed to a gas turbine engine in a combined cycle plant, as well as for other commercial uses relying on clean hydrocarbon fuels for combustion. Specifically, the invention relates to a new process for efficiently converting carbon monoxide and removing carbon dioxide from a synthesis gas stream and for producing carbon dioxide and free hydrogen using a high temperature sulfur removal step in combination with multiple water-gas shift reactions and hydrogen separation step.

The new method and system eliminate the need to rely on conventional acid gas removal processes to remove sulfur compounds and other highly regulated emissions from a syngas fuel or other gaseous source stream. As used herein, the term "acid gas removal" (or "AGR") refers generally to the removal of COS, $CO_2$, $H_2S$ and other acidic gasses created by hydrocarbon feedstocks containing sulfur compounds (sometimes referred to as "acid gasses"). A typical AGR process removes acid gasses (normally using solvent absorption) to create a more useful, "clean" fuel that can be fed to one or more combustors in, for example, a gas turbine engine in a combined cycle power plant.

BACKGROUND OF THE INVENTION

In recent years, many combined cycle power plants have opted to use some form of synthesis gas ("syngas") as a principal fuel component to increase the use of clean fuel gas derived from gasification of a cheaper solid fuel, such as coal, in a gas turbine engine or combined cycle plant. "Syngas" is the generic term given to a gas mixture that typically contains carbon monoxide and hydrogen, as well as lower molecular weight hydrocarbons such as $CH_4$ and a substantial fraction of non-hydrocarbon components including nitrogen, carbon dioxide, $H_2O$ and oxygen. Normally, syngas also contains a significant amount of sulfur byproducts or other contaminants generated in upstream gasification operations, particularly gas compounds produced by coal gasification plants. Some, more environmentally friendly methods exist to produce syngas, such as steam reforming of either natural gas or liquid hydrocarbons. However, in all such systems, the end product has less than half the energy density of natural gas and contains hydrogen, large amounts of carbon monoxide and at least some carbon dioxide. Syngas nevertheless represents a valuable potential supplemental fuel source, particularly in combined cycle plants that include a gas turbine engine.

As noted, a major concern of most gasification systems which produce syngas, particularly those relying on coal as a primary fuel, relates to the high volume percent of carbon monoxide and carbon dioxide, as well as the presence of sulfur compounds (such as $H_2S$ and COS) and even nitrogen compounds—all of which reduce the thermal value of the syngas, create complex pollution control problems and decrease combined cycle plant efficiencies. Thus, in recent years, a number of efforts have been made, with only limited success, to reduce the amount of sulfur and other non-fuel components in the syngas feed without jeopardizing the thermodynamic efficiency of a plant or increasing the capital expenditures necessary to satisfy strict federal and state emission control standards.

One well known process for removing sulfur and other acidic gaseous pollutants in a syngas fuel stream is the "Selexol" process first developed by Universal Oil Products in the 1980s. In a Selexol system, a solvent absorbs acid gases such as $H_2S$ present in the feed at a relatively high pressure (in the range of 300 to 1500 psia) and low temperature (typically less than 40° F.). The enriched solvent containing the absorbed acid gases is then reduced in pressure and the acid gas is stripped from the solvent using steam as the heating source. In the past, the Selexol process has been successfully used to isolate and recover hydrogen sulfide and carbon dioxide as separate streams with the hydrogen sulfide being converted to elemental sulfur or used to form sulfuric acid. Despite those successes, Selexol is considered an expensive and complex alternative for eliminating sulfur and $CO_2$ from a syngas feedstock since it involves cooling high temperature gases from the gasifier to low process temperatures.

Although some advances have been made in converting and purifying syngas produced from coal gasification, e.g., as part of an integrated gasification combined cycle ("IGCC") plant, the commercialization of most "coal-to-hydrogen" technologies has been hindered by the high capital costs associated with removing inorganic impurities, particularly the sulfur present in domestic coal which ultimately form oxides and/or $H_2S$ that create serious environmental concerns. In addition, most known liquid absorption units for $H_2S$ involve low temperature processes that require that the entire gas stream be cooled, resulting in additional energy losses and lower efficiencies.

Apart from sulfur, the conversion of carbon monoxide and removal of carbon dioxide in combustion waste gas streams has become much more commercially significant in recent years, in part because of the economic value of converting, isolating and compressing the carbon dioxide for use in other industries or to make a "clean" carbon free exhaust release to the atmosphere. Some current $CO_2$ capture methods rely on a fuel decarbonization process which converts carbon monoxide to carbon dioxide and removes the $CO_2$ from the system before any combustion of fuel occurs in the power plant. However, a typical decarbonization plant is complex because it requires the use of one or more catalytic reactors and reformers as essential components. Decarbonization systems can also be thermodynamically inefficient and costly to install and operate. For example, a decarbonization process can result in an 8-12% penalty in the overall plant efficiency due to the energy required and released during the reforming process. Although $CO_2$ can be separated from a syngas feed using a gas separation device such as permeable membranes, the separation invariably must be carried out at high temperatures and pressures in order to minimize the necessity for compressing the $CO_2$ prior to final sequestration.

As for the hydrogen present in syngas, some conventional systems are capable of separating fuel grade $H_2$ from a syngas feedstock but require a large number of unit operations such as multiple absorption and desorption columns and a large footprint within an existing plant. In recent years, hydrogen-selective membranes have also been used with some success to isolate the hydrogen. However, the use of membranes alone does not produce a "clean" syngas product free from residual sulfur, carbon monoxide and carbon dioxide constituents. In addition, the known hydrogen-selective membranes are not permeable to carbon monoxide and thus unable to transfer the separated gas to a fuel-rich permeate stream. (The final residual $H_2$ and CO in the membrane retentate stream are often referred to as hydrogen "slip"). Most plant designs using hydrogen-selective membranes also require additional unit operations to ensure that the overall thermal efficiency of the plant is not degraded by the $H_2$ and CO slip following membrane separation.

Thus, a significant need still exists in the power generation industry to create a more efficient system to effectively clean a raw syngas feed by removing unwanted sulfur byproducts, converting CO to $CO_2$ and sequestering the $CO_2$ without incurring the additional high energy costs and capital equipment expenditures normally required to accomplish those process objectives.

BRIEF DESCRIPTION OF THE INVENTION

The present invention includes a method and system for capturing and isolating carbon dioxide and hydrogen gas from a high temperature synthesis gas stream containing a substantial amount of CO and sulfur compounds for use as a "clean" supplemental hydrocarbon fuel source. An exemplary method comprises the steps of reducing the temperature of the high temperature synthesis gas stream from a gasifier, removing substantially all of the sulfur compounds present in the synthesis feedstock, converting a first portion of carbon monoxide (CO) to carbon dioxide in a first high temperature water-gas shift reaction, converting a second portion of CO to carbon dioxide using a second low temperature water-gas shift reaction, converting a third portion of CO to carbon dioxide using a third low temperature water-gas shift reaction, and finally separating out substantially all hydrogen present in the treated synthesis gas stream for use as a supplemental fuel component.

The invention also contemplates using the new CO conversion and hydrogen separation methodology to produce a supplemental hydrogen-based fuel source for use in a combined cycle plant that includes a gasifier for producing the syngas feed, a high temperature desulfurization unit to remove the unwanted sulfur contaminants, first second and third water-gas shift reactors, a hydrogen separating device such as a hydrogen permeable membrane, a gas turbine engine and an electrical generator to generate power.

BRIEF DESCRIPTION OF THE DRAWINGS

The application FIGURE is a process flow diagram depicting the exemplary process steps and major pieces of equipment necessary to carry out the present invention, namely to remove the unwanted sulfur components, efficiently convert CO to CO2, separate out the hydrogen fuel fraction and create an improved supplemental fuel source containing additional hydrogen for use in a combined cycle plant.

DETAILED DESCRIPTION OF THE INVENTION

As noted, the present invention provides a new, and more cost effective, method for removing sulfur compounds and CO from a syngas feed without requiring any use of a conventional solvent-based acid gas removal ("AGR") subsystem as part of the process. In order to achieve that objective, the invention relies for the first time on the combination of a high temperature desulfurization step and a plurality of water-gas shift reactions and related heat generation steps. The end result is the removal of all residual sulfur and a complete (almost 100% conversion) shift of the CO resident in the syngas to $CO_2$, thereby completely eliminating the need for any solvent-based process such as Selexol. The process also results in the virtual elimination of CO in the syngas feed without any need for a catalytic converter to handle any residual CO left in the exhaust, again unlike Selexol or other known prior art processes. The new system also effectively isolates and separates any hydrogen present in the feed gas to create a valuable supplemental fuel source for use in a combined cycle process.

The well-known water-gas shift reaction referred to herein proceeds as follows:

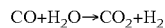

In essence, the water-gas shift process reacts carbon monoxide gas (CO) with steam at a relatively high temperature to produce a mixture of hydrogen and carbon dioxide. The reaction is exothermic and requires a catalyst, such as iron, iron compounds (e.g., oxides), chromium, chromium compounds or other catalyst materials known in the art. The rate of conversion to hydrogen in the reaction can be accelerated at higher temperatures, while the extent of conversion becomes greater at lower, more controlled reaction temperatures. The carbon dioxide can be separated from the reaction product gas mixture using carbonate-forming systems such as ethanolamine absorption columns or other known processes.

In the past, most water-gas shift reactions have been carried out without first removing sulfur using either a single stage shift reactor or a two-stage reactor to attain an acceptable rate of conversion of carbon monoxide and steam to hydrogen. The single stage reaction is exothermic and favored by inlet temperatures in the range of 450° F. to 900° F., with the gaseous effluent leaving the shift reactor consisting primarily of carbon dioxide and hydrogen gas. In a two-stage water-gas shift conversion, two catalytic shift reactors operating at high and low temperatures, respectively, can achieve a higher degree of conversion to free hydrogen. See, e.g., commonly-owned U.S. Pat. No. 4,476,683.

As described above, when a syngas product is produced, the gasification normally results in an exhaust gas containing sulfur byproducts, such as $H_2S$, as well as a significant fraction of CO and lesser amounts $CO_2$, $O_2$, $H_2$, water (steam). The process according to the invention converts virtually all of the CO (which nominally comprises about 50% by volume of the syngas feed) into $CO_2$ by "shifting" the CO in a series of sequential water-gas shift reactions. In simple terms, the $H_2O$ and CO produce $CO_2$ and hydrogen while generating heat due to the exothermic water-gas shift reactions. The result is a substantially modified syngas comprising mostly hydrogen and $CO_2$, along with a very small (almost inconsequential) amount of unconverted, residual CO.

In applicants' process, the sulfur compounds present in the syngas feed are removed prior to the water-gas shift reactions using a high temperature gas desulfurization process. The result is an initially "sulfur free" syngas product stream which then undergoes three separate water-gas shift reactions in series. The final result is a gas comprising hydrogen and $CO_2$ along with unreacted nitrogen. The fully "shifted" syngas fuel stream then undergoes a separate series of operations to isolate and collect the free hydrogen, nominally using one or more hydrogen separation device such as membrane units.

Thus, unlike known conventional systems, all sulfur present in the syngas is removed first, followed by conversion of virtually all CO to $CO_2$, and finally the separation of the $CO_2$ and free hydrogen (including any $H_2$ generated during the water-gas shift reactions). Taken together, those steps illustrate a critical difference between the invention and a conventional Selexol process, which is designed to remove the $H_2S$ and $CO_2$ using a series of absorption and stripping columns and solvent cooling and recovery operations. An obvious advantage therefore exists in the installation and continued operating costs of the invention which effectively remove the need for any solvent-based sulfur removal equipment. In addition, very little CO (normally only parts per million) remains in the system due to the additional (third) water-gas shift reaction, which serves to convert any remaining, residual CO into $CO_2$ and $H_2$.

Turning to the FIGURE in the application, the exemplary process steps and major pieces of equipment necessary to carry out the invention are depicted generally at 10, with an initial syngas product being used as the primary feed to the system from a conventional coal gasifier as shown. As noted, the syngas product at gasifier/RSC step 11 contains a large fraction of carbon monoxide and sulfur byproducts from the initial combustion.

In step 11, an integrated gasification occurs, namely the conversion of solid or liquid hydrocarbon-based fuel to an all gas exhaust stream containing significant fuel value, such as syngas, typically comprising approximately 50% by weight carbon monoxide, and lower amounts of hydrogen, nitrogen, sulfur compounds (such as $H_2S$) and unreacted oxygen. The exhaust stream from the gasifier (typically at an exit temperature of about 2,200-2,400° F.) undergoes an immediate cooling step using one or more radiant syngas coolers (labeled "RSC" in the FIGURE) which lowers the syngas temperature down to about 1,250° F.

Following the initial cooling, the multi-component exhaust stream passes via HTDS feed line 12 into high temperature desulfurization unit ("HTDS") 13 operating at approximately 900° F., and thereafter into a direct sulfur recovery process ("DSRP") 37 where substantially all of the sulfur 40 is removed as described above. Desulfurization processes for synthesis gas streams are known and typically performed in a reactor through direct contact with a zinc-containing material (possibly with an alumina additive). In the invention, a certain amount of tail gas generated during the DSRP Process is recycled to HTDS unit 13 as recycle 39. The feed to HTDS 13 also includes a portion of a first condensate return 36 generated downstream in a low temperature gas cooling operation ("LTGC" step 21 discussed below). A "Slip Stream" 42 comprising mostly free hydrogen, CO & $CO_2$ is taken to DSRP section unit 37 as shown for generation of elemental sulfur.

After the desulfurization step is complete, the exit gasses from the HTDS unit undergo a series of water-gas shift reactions, beginning with a high temperature ("HT") shift reaction occurring at about 680° F. at step 15 with HT shift feed 14 containing a second portion of condensate return 35 generated by the low temperature gas cooler. The exhaust from the first high temperature water-gas shift reaction immediately undergoes a second low temperature water-gas shift reaction at 17 (at approximately 400° F.) using HT shift exhaust feed 16 combined with a third portion 34 of condensate generated by the same low temperature gas cooler.

The discharge 18 from the first low temperature water-gas shift reaction 17, which is now significantly reduced in CO concentration, feeds directly into second low temperature water-gas shift reaction 19 occurring at about 380° F. The resulting gas from 19 enters the low temperature gas cooler ("LTGC") 21 which cools the gas to about 90° F., thereby condensing water vapor in the gas to produce condensate 33. The condensate is then recycled as noted above in connection with HTDS step 13, HT shift 15 and LT shift 17.

The embodiment in the FIGURE thus shows the use of an initial high temperature water-gas shift reaction followed by a first low temperature shift reaction and a second low temperature shift reaction which together remove virtually all of the CO present in the initial syngas feed. The first shift reaction normally achieves about 70-80% conversion of CO to $CO_2$; the second shift reaction results in about a 95% conversion; and the third shift reaction results in a conversion of virtually all of the remaining CO (with only parts per million remaining). Applicants believe that the final shift reaction is responsible for no more than about 5% of the total CO conversion.

The low temperature gas stream resulting from LTGC 21 (now virtually depleted of any CO but containing free hydrogen, carbon dioxide and nitrogen) feeds directly into and through a hydrogen separator device such as a membrane separation station 23 which separates and isolates the hydrogen and trace amount of nitrogen present in the feed as $H_2$ discharge 30. At the same time, the carbon dioxide discharge 24 from the hydrogen membrane separation station (which may contain a small, residual amount of free hydrogen and an even smaller amount of CO) is treated in $CO_2$ sequestration step 25 as indicated, resulting in a very clean $CO_2$ product stream 43 that is sequestered or used for other applications, with the residual $H_2$ and CO stream 26 combined with nitrogen and hydrogen produced by hydrogen separator device such as membrane separation station 23 having one or more hydrogen membranes 50.

The final combined stream containing separated hydrogen, nitrogen and residual amounts of CO (if any) are then fed as supplemental hydrogen-based fuel stream 41 to combined cycle plant 31. In most combined cycle plants such as that shown at 31, a steam turbine and gas turbine are operatively coupled to a common shaft to drive a single electrical generator, with the primary source of energy input being the fuel burned in the gas turbine combustors. Waste heat from the gas turbine generates high pressure steam typically using a heat recovery steam generator ("HRSG"). In that manner, the steam creates a secondary source of power input to the rotating shaft train.

As noted above, very little CO (perhaps parts per million) remains in the system depicted in the FIGURE at step 25 due, in major part, to the additional (third) water-gas shift reaction which serves to convert almost all remaining, residual CO into $CO_2$ and $H_2$. The combined $CO_2$ sequestration feed 24 comprising CO, $CO_2$ and $H_2$ also contains only a small amount of free hydrogen ("hydrogen slip"), i.e., the amount of residual hydrogen that may not be removed by the hydrogen membrane in step 23 and thus forms part of a predominantly carbon dioxide stream.

Finally, air extracted from the combined cycle 31 is recycled back through air separation unit ("ASU") 27 in order to provide additional oxygen to gasifier/RSC 11 via ASU oxygen feed line 28. In like manner, a portion of the nitrogen generated by ASU 27 feeds back into hydrogen membrane separation station 23.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of capturing and isolating carbon dioxide and hydrogen gases from a high temperature synthesis gas stream containing CO and sulfur compounds, comprising:
reducing the temperature of said high temperature synthesis gas stream;
removing sulfur compounds present in said synthesis gas stream;
converting CO present in said synthesis gas stream to carbon dioxide using a first high temperature water-gas shift reaction;
converting CO in said synthesis gas stream to carbon dioxide using a second low temperature water-gas shift reaction;
converting CO present in said synthesis gas stream to carbon dioxide using a third low temperature water-gas shift reaction;
separating out hydrogen present in said synthesis gas stream following completion of said first, second and third water-gas shift reactions;
condensing water present in said synthesis gas stream following said first, second and third water-gas shift reactions;
recycling said condensed water following said first, second and third water-gas shift reactions; and
recycling said condensed water to the synthesis gas stream upstream of said first and second water-gas shift reactions.

2. A method according to claim 1, further comprising the step of condensing water present in said synthesis gas stream following said first, second and third water-gas shift reactions.

3. A method according to claim 2, further comprising the step of recycling said condensed water following said first, second and third water-gas shift reactions.

4. A method according to claim 2, wherein said step of condensing water present in said synthesis gas stream takes place at 90° F.

5. A method according to claim 1, further comprising the step of feeding said hydrogen to one or more combustors in a combined cycle plant.

6. A method according to claim 1, wherein said high temperature synthesis stream contains $H_2S$, CO, nitrogen, steam and hydrogen.

7. A method according to claim 1, wherein said hydrogen comprises hydrogen initially present in said high temperature synthesis gas stream and hydrogen formed during said first, second and third water-gas shift reactions.

8. A method according to claim 1, wherein said sulfur compounds comprise hydrogen sulfide ($H_2S$) and sulfur dioxide ($SO_2$).

9. A method according to claim 1, wherein said step of reducing the temperature of said high temperature synthesis gas stream lowers the temperature of said synthesis gas from 2,400° F. to 1,200° F.

10. A method according to claim 1, wherein said step of removing sulfur compounds takes place at 900° F.

11. A method according to claim 1, wherein said first high temperature water-gas shift reaction takes place at 680° F.

12. A method according to claim 1, wherein said second low temperature water-gas shift reaction takes place at 400° F.

13. A method according to claim 1, further comprising the step of sequestering $CO_2$ present in the synthesis gas stream following said first, second and third water-gas shift reactions.

14. A method according to claim 1, wherein said third low temperature water-gas shift reaction takes place at 380° F.

15. A method according to claim 1, wherein said step of separating hydrogen in said synthesis gas stream further comprises the step of separating the hydrogen from carbon dioxide using a hydrogen separating device comprising a permeable membrane.

16. A system for generating electrical power using a modified syngas feed, comprising:
a gasifier for generating a syngas feed comprising free hydrogen, steam, CO, $CH_4$, $CO_2$, nitrogen and sulfur compounds;
a high temperature desulfurization unit configured to operate at a desulfurization temperature and remove said sulfur compounds from said syngas feed;
a first high temperature water-gas shift reactor configured to operate at a first conversion temperature which is lower than the desulfurization temperature and convert carbon monoxide in said syngas feed to carbon dioxide and form a first converted syngas stream;
a second low temperature water-gas shift reactor configured to operate at a second conversion temperature which is lower than the first conversion temperature and further convert carbon monoxide to carbon dioxide to form a second converted syngas stream;
a third low temperature water-gas shift reactor configured to operate at a third conversion temperature which is lower than the second conversion temperature and further convert carbon monoxide to carbon dioxide to form a third converted syngas stream;
one or more hydrogen separators comprising membranes configured to separate out free hydrogen from said third converted syngas stream;
a gas turbine engine configured to receive and combust said free hydrogen;
an electrical generator coupled to said gas turbine engine;
a low temperature gas cooler sized to reduce the temperature of said third converted syngas stream and produce a water condensate stream; and
a condensate return line to recycle the water condensate stream upstream of the first water-gas shift reactor and the second water-gas shift reactor.

17. A system according to claim 16, further comprising a carbon dioxide sequestration unit configured to separate out carbon dioxide from the converted syngas stream.

18. The system according to claim 16, further comprising an air separation unit for recycling oxygen to said gasifier.

19. The system according to claim 16, further comprising means for feeding nitrogen and said free hydrogen to said gas turbine engine.

20. A method of capturing and isolating carbon dioxide and hydrogen gases from a high temperature synthesis gas stream containing CO and sulfur compounds, comprising:
reducing the temperature of said high temperature synthesis gas stream;
removing sulfur compounds present in said synthesis gas stream;
reducing the temperature of said synthesis gas stream to a first conversion temperature;
converting a first portion of CO present in said synthesis gas stream to carbon dioxide using a first high temperature water-gas shift reaction;
reducing the temperature of said synthesis gas stream to a second conversion temperature which is lower than the first conversion temperature;

converting a second portion of CO present in said synthesis gas stream to carbon dioxide using a second low temperature water-gas shift reaction;

converting a third portion of CO present in said synthesis gas stream to carbon dioxide using a third low temperature water-gas shift reaction;

separating out hydrogen present in said synthesis gas stream following completion of said first, second, and third water-gas shift reactions;

condensing water present in said synthesis gas stream following said first, second, and third water-gas shift reactions;

recycling said condensed water following said first, second, and third water-gas shift reactions; and recycling said condensed water to the synthesis gas stream upstream of said first and second water-gas shift reactions.

* * * * *

UNITED STATES PATENT AND TRADEMARK OFFICE
CERTIFICATE OF CORRECTION

PATENT NO. : 9,458,014 B2
APPLICATION NO. : 13/729097
DATED : October 4, 2016
INVENTOR(S) : Reddy et al.

It is certified that error appears in the above-identified patent and that said Letters Patent is hereby corrected as shown below:

On the Title Page

The name of the Assignee, General Electronic Company should be General Electric Company.

Signed and Sealed this
Twenty-seventh Day of June, 2017

Joseph Matal
*Performing the Functions and Duties of the
Under Secretary of Commerce for Intellectual Property and
Director of the United States Patent and Trademark Office*